March 10, 1931.  S. DEBUS  1,795,844
LUGGAGE CARRIER FOR AUTOMOBILES
Filed Oct. 19, 1928   2 Sheets-Sheet 1
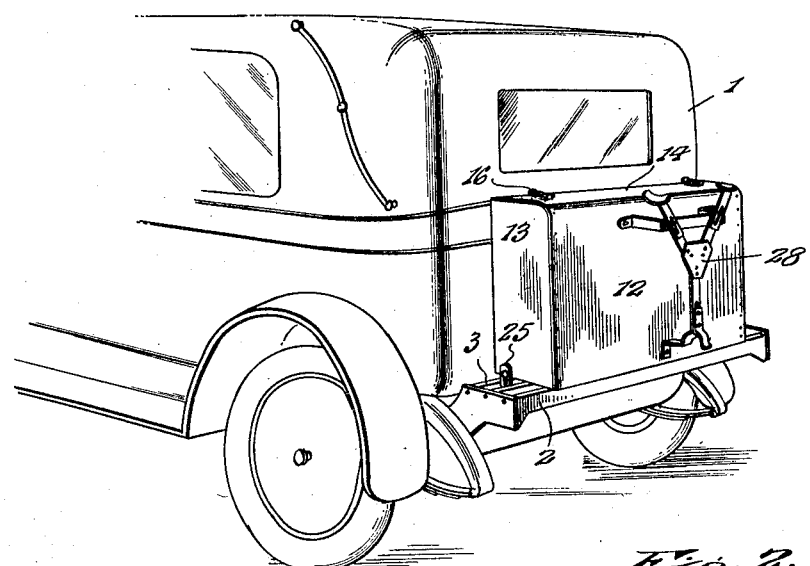
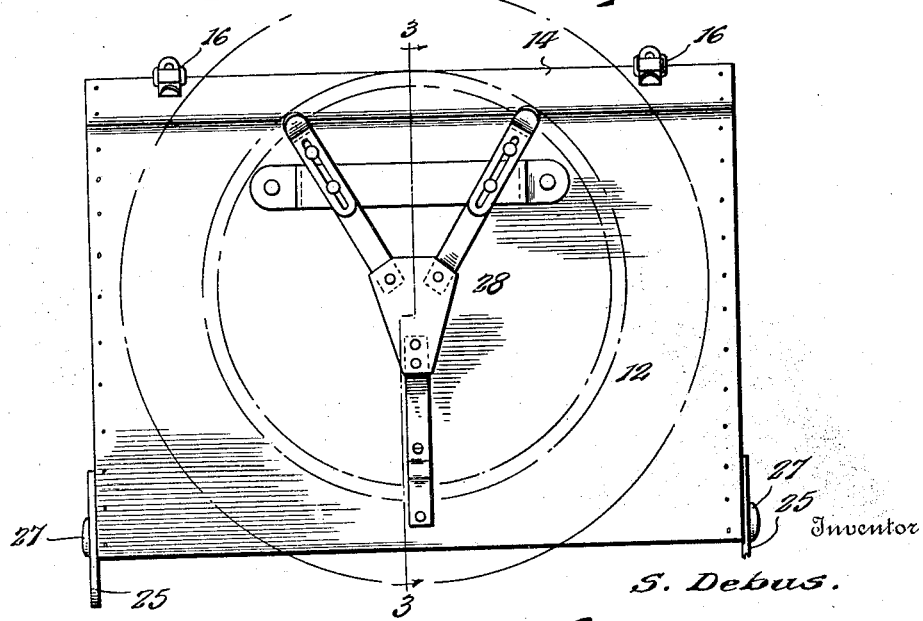
Inventor
S. Debus.
By Lacey & Lacey, Attorneys March 10, 1931.  S. DEBUS  1,795,844
LUGGAGE CARRIER FOR AUTOMOBILES
Filed Oct. 19, 1928    2 Sheets-Sheet 2
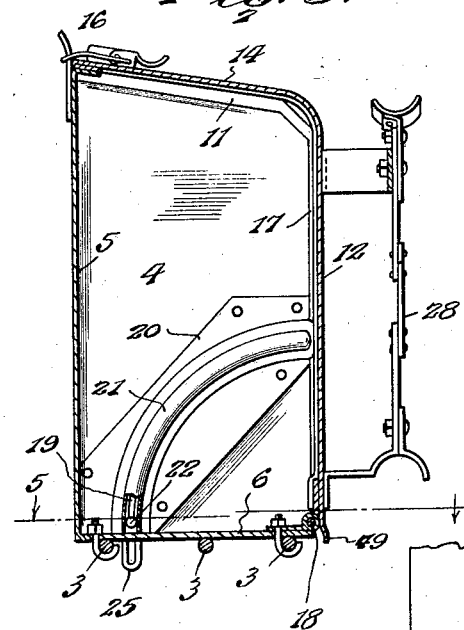
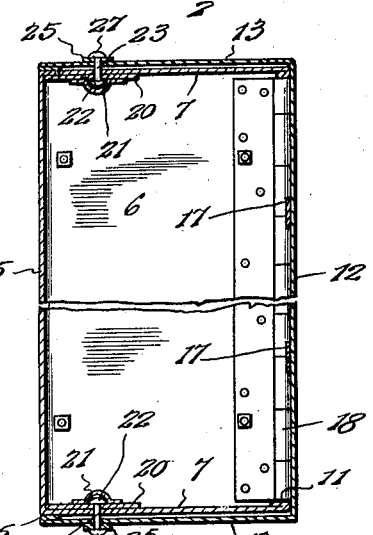
Inventor
S. Debus.
By Lacey & Lacey, Attorneys Patented Mar. 10, 1931

1,795,844

UNITED STATES PATENT OFFICE

SANDER DEBUS, OF HASTINGS, NEBRASKA

LUGGAGE CARRIER FOR AUTOMOBILES

Application filed October 19, 1928. Serial No. 313,530.

This invention relates to means for carrying luggage and merchandise or other articles at the rear of a motor vehicle and has for its object the provision of a novel construction whereby clothing and small articles may be thoroughly protected against dust or other deleterious influences and the device may be readily extended to support and carry larger articles as may be desired. A particular object of the invention is to provide novel and efficient means whereby the movable member of the carrier or trunk will be firmly supported in its extended position and which will be so disposed and arranged that it will be prevented from catching in and injuring any articles of clothing which may be placed in the trunk and will be guarded against breakage or displacement. The invention is illustrated in the accompanying drawings and consists of certain novel features which will be hereinafter first fully described and then more particularly defined in the appended claims.

In the drawings:

Figure 1 is a perspective view of my improved trunk or luggage carrier showing the same mounted upon a vehicle and in closed position, Fig. 2 is an enlarged rear elevation of the same;

Fig. 3 is a transverse vertical section on the line 3—3 of Fig. 2,

Fig. 4 is a view similar to Fig. 3 but showing the trunk in opened or extended position, Fig. 5 is a horizontal section on the line 5—5 of Fig. 3, and Fig. 6 is an enlarged elevation of the retaining and stop member in the position it assumes when the trunk is open.

In Fig. 1, a portion of an automobile is shown as 1 and is illustrated as equipped at its rear with a supporting shelf or bracket 2 including spaced rods or bars 3.

The trunk is secured upon and carried by the shelf or bracket 2 and consists of a front or stationary member 4 including a front wall 5, a bottom 6 and sides 7, the top and rear of the stationary member being open, as shown most clearly in Fig. 4, and the front wall having its upper edge portion turned rearwardly to provide a flange 8, also as shown most clearly in Fig. 4. The bottom 6 rests directly upon the rods 3 of the supporting shelf or bracket and securing hooks 9 are engaged with some of said rods and have their shanks inserted upwardly through openings provided therefor in the bottom of the trunk member and equipped with securing nuts 10 whereby the trunk will be firmly secured upon the shelf in an obvious manner. The free edges of the side walls 7 are doubled inwardly upon themselves to provide reinforcing flanges 11 so that buckling of the structure will be counteracted. The trunk also includes a movable member which consists of a wall 12 which, in closed position of the trunk, constitutes the rear wall thereof and in extended position constitutes the bottom of the extension, as will be understood upon reference to Figs. 3 and 4. This movable member also includes end walls 13 and a top wall 14 which are preferably formed integral with the wall 12 and have their free edges doubled upon themselves to form a reinforcing flange 15. The front side and bottom of the movable member are open and the parts are so proportioned that in closed position the end walls 13 will be disposed at the outer sides of the end walls 7 and will entirely cover the same, and latch devices, indicated at 16, are provided upon the meeting free edges of the fixed and movable members of the trunk so that, when the trunk is closed, the movable member may be firmly fastened in the upright closed position shown in Figs. 1, 2 and 3. These latch devices may be of any approved or known form and, in themselves, constitute no part of the present invention and further detail description of the same is, therefore, deemed unnecessary. The movable member of the trunk is reinforced by metallic strips or flat bars 17 which are secured upon the walls 12 and 14 of the member and may be spot-welded or otherwise intimately united therewith. The two members are connected by hinges, indicated at 18, of any approved form and the wall 12 of the movable member is preferably extended somewhat beyond the hinge, as shown at 49, whereby in extended position the hinge will be covered and thereby protected against the entrance of dust thereto and the engagement of the extended slightly offset edge 49 with the bottom wall 6 of the stationary member will serve to limit the downward movement of the swinging member. The end walls of the stationary member are constructed with arcuate slots 19 therethrough having the hinge 18 as their center and said end walls are reinforced by plates 20 secured to their inner sides and extending obliquely thereof through the extent of said slots, as shown. On the inner surfaces of these reinforcing plates are arcuate beaded covers 21 which extend over the slots 19 and form housings and guides for the heads 22 of retaining pins or studs 23 which extend through the slots 19 and are carried by the end walls 13 of the outer swinging member of the trunk, the end walls of the swinging member having notches, indicated at 24, to accommodate the studs or pins. Fixed upon the outer surfaces of the end walls 13 by spot-welding or other means are slotted links 25 which slidably engage the outer ends of the studs or pins 23 and are disposed at the inner sides of the outer heads 27 thereof. The ends of the slots 19 are closed and are located, respectively, at the bottom 6 and the rear edges of the end walls 4 of the fixed member, while the links or keepers 25 have a limited play on the pins or studs. When the trunk is closed, as shown in Figs. 1 and 3, the links 25 will depend below the bottom of the trunk between rods 3 of the supporting shelf, and this arrangement permits the movable member to fit closely over the stationary member and be fastened in the closed position. When the swinging member is moved to the extended position shown in Fig. 4, it will project rearwardly from the stationary member and the free ends of the respective links or keepers 25 will engage the studs 23 so that the outward or opening movement of the member will be limited and it will be supported with its walls 12 in the same horizontal plane as the bottom 6 of the stationary member. In this position, the supporting area of the trunk or carrier is much greater than in the closed position of the same and the entire top thereof is open so that it is adapted to carry bulky articles which cannot be carried when the trunk is closed. It will also be noted that the retaining pins or studs 23 are headed at both ends and their heads serve to maintain the close parallel relation of the end or side walls of the two trunk members in all positions of the same and, consequently, spreading of the end or side walls is prevented. The beaded cover 21 completely houses the inner end of the retaining pin or stud at all times so that it cannot tear or otherwise injure any articles of clothing which may be placed in the trunk and the outer end of the stud or retaining pin will not project from the trunk laterally to such an extent that it is liable to be caught by passing objects and torn from the trunk.

The lost motion which occurs between the keepers 25 and the studs or retaining pins 23 will permit the travel of the stud in opening the trunk to be arrested before the movable member has reached the limit of its movement so that it is not necessary to continue the slot 19 through the upright rear edge of the stationary member but a wall of metal will be left against which the stud will bear and receive the thrust to firmly support the movable member in the opened position.

A tire carrier 28 is secured to the outer face of the wall 12 and this tire carrier may be of any approved form without involving any departure from the present invention. The tire carrier is so disposed that, when the trunk is closed, the spare tire may be very easily and conveniently removed when its use is necessary and when the trunk is opened the tire and its carrier will be disposed below the trunk in such position that it will not interfere in any way with the placing of articles in the trunk or carrier or the removal of articles therefrom.

My invention provides a trunk structure which is simple and inexpensive and will render the entire inner cubic content of the trunk available for the storage of clothing or other articles without causing any damage thereto. The entire structure may be conveniently produced from sheet metal so that it will be strong and durable but will not be of excessive weight to add to the dead weight of the vehicle.

Having thus described the invention, I claim:

1. A luggage carrier comprising a stationary member, means for securing said member at the rear of a vehicle, said member having an arcuate slot in an end wall, a reinforcement on the inner side of said end wall bridging the slot and extending from end to end thereof, a movable member hinged to the stationary member concentrically with said slot, and a retaining pin carried by the end wall of the movable member and having heads at both ends, said heads engaging the inner surface of the end wall of the stationary member and the outer surface of the end wall of the movable member respectively.

2. A luggage carrier comprising a stationary member, means for securing said member at the rear of a vehicle, said member having arcuate slots in its end walls, a movable member hinged to the stationary member concentrically with said slots and constructed in one position to completely house the stationary member, slotted keeper lugs carried by the end walls of the movable member, headed retaining pins passing through the slots of said keeper lugs and the slots in the end walls of the stationary member, and arcuate covers secured upon the inner sides of the end walls of the stationary member over the slots therein and housing the inner ends of said retaining pins.

In testimony whereof I affix my signature.

SANDER DEBUS. [L. S.]